United States Patent
Fumanelli

(10) Patent No.: US 11,600,157 B2
(45) Date of Patent: Mar. 7, 2023

(54) ATM WITH SENSORIZED CONNECTORS FOR DETECTING REMOVAL THEREOF FROM THE PC OF THE ATM WITH BLOCKING OF THE DELIVERY FUNCTIONS

(71) Applicant: M.I.B. S.r.l., Milan (IT)

(72) Inventor: Giuseppe Ezio Fumanelli, Melzo (IT)

(73) Assignee: M.I.B. S.r.l., Milan (IT)

( * ) Notice: Subject to any disclaimer, the term of this patent is extended or adjusted under 35 U.S.C. 154(b) by 0 days.

(21) Appl. No.: 17/376,602

(22) Filed: Jul. 15, 2021

(65) Prior Publication Data
US 2022/0020252 A1 Jan. 20, 2022

(30) Foreign Application Priority Data

Jul. 17, 2020 (IT) .......................... 102020000017458
Nov. 25, 2020 (IT) .......................... 102020000028385

(51) Int. Cl.
*G08B 13/14* (2006.01)
*E04B 1/343* (2006.01)
*G06F 21/88* (2013.01)
*G07F 19/00* (2006.01)

(52) U.S. Cl.
CPC ...... *G08B 13/1409* (2013.01); *E04B 1/34357* (2013.01); *G06F 21/88* (2013.01); *G07F 19/20* (2013.01); *G08B 13/1436* (2013.01)

(58) Field of Classification Search
CPC ...... G06F 21/88; G07F 19/20; G08B 13/1436
See application file for complete search history.

(56) References Cited

U.S. PATENT DOCUMENTS

| | | | |
|---|---|---|---|
| 6,508,397 B1* | 1/2003 | Do .......................... | G07F 19/20 902/1 |
| 2004/0140350 A1* | 7/2004 | Valencia ................. | G07F 19/20 235/375 |
| 2005/0073423 A1 | 4/2005 | Kim | |

(Continued)

FOREIGN PATENT DOCUMENTS

WO WO-9923563 A1 * 5/1999 ............. G06F 21/82

OTHER PUBLICATIONS

Fannie, USB 3.0 A/M-Micro B/M Cable, Jul. 1, 2010, QVS, Revision: C (Year: 2010).*

(Continued)

*Primary Examiner* — Nabil H Syed
*Assistant Examiner* — Cal J Eustaquio
(74) *Attorney, Agent, or Firm* — Volpe Koenig

(57) ABSTRACT

The proposed ATM comprises a microcontroller for controlling a banknote dispenser and a computer for managing the ATM, which are arranged inside and outside, respectively, a safe. The computer is provided with one or more ports for interfacing with it; all the ports are occupied by corresponding connectors. A motion sensor is associated with each single connector for detecting any tampering or movements indicative of its removal from the corresponding port; in this case, the dispensing of the banknotes is inhibited, for example, by interrupting an electrical power supply of the microcontroller and/or of the banknote dispenser. A corresponding operation method of the ATM is proposed. A program product for controlling the ATM are also proposed.

15 Claims, 7 Drawing Sheets

(56) References Cited

U.S. PATENT DOCUMENTS

| | | | |
|---|---|---|---|
| 2005/0083200 A1* | 4/2005 | Kim | G08B 13/1436 340/568.2 |
| 2010/0023744 A1 | 1/2010 | Markel et al. | |
| 2015/0109002 A1 | 4/2015 | Dichtl et al. | |
| 2018/0032717 A1 | 2/2018 | Cronin | |
| 2019/0355221 A1 | 11/2019 | Dietz et al. | |

OTHER PUBLICATIONS

Amazon.com, USB C Cable, [5 Pack 3.1A] QC 3.0 Fast Charging USB Type C Cable, Sep. 2020 pp. 1 and 7 (Year: 2020).*
Ministry of Economic Development, "Search Report from IT Application No. 102020000017458", Dec. 2, 2020, pp. 1 through 15, Published: IT.

* cited by examiner

ATM WITH SENSORIZED CONNECTORS FOR DETECTING REMOVAL THEREOF FROM THE PC OF THE ATM WITH BLOCKING OF THE DELIVERY FUNCTIONS

TECHNICAL FIELD

The present disclosure relates to the field of Automatic Teller Machines (ATM); more specifically, the present disclosure relates to automatic dispensers of banknotes.

TECHNOLOGICAL BACKGROUND

The background of the present disclosure is hereinafter introduced with the discussion of techniques relating to its context. However, even when this discussion refers to documents, acts, artefacts and the like, it does not suggest or represent that the discussed techniques are part of the prior art or are common general knowledge in the field relevant to the present disclosure.

The automatic banknote dispensers, also known as bancomats or Automatic Teller Machines (ATMs), are used to withdraw and/or deposit cash in the form of banknotes without the aid of human staff; a typical example in Italy are the automatic dispensers belonging to the "Bancomat" (trademark) circuit, commonly known as "Bancomats". The automatic dispensers are very convenient (for example, outside the opening hours of banks or in places far from them) and fast (since they avoid queues at physical counters).

Each automatic dispenser is provided with a safe, inside which a banknote dispenser is arranged being capable of dispensing the amount of banknotes that is requested by users (in the course of withdrawal operations). A management system for example, a computer manages operation of the automatic dispenser locally. For this purpose, the computer interacts with a number of peripherals of the automatic dispenser; particularly, the computer controls a microcontroller of the banknote dispenser (arranged inside the safe as well). Moreover, the computer communicates with a central processing system, for example, a server of the bank to which the automatic dispenser is connected. For these reasons (as well as for reasons of space), the computer is generally placed outside the safe in a dedicated cabinet.

The computer is provided with a number of ports that are used for connecting the computer (physically) to the peripherals of the automatic dispenser and to the server. Particularly, these connections are used for exchanging management signals between the computer and the microcontroller of the banknote dispenser. For example, a transmission line, such as a cable extends from the computer (to which it is connected through a corresponding connector inserted into a port of the computer, for example, of USB type) to the microcontroller (inside the safe). For security reasons, the communications between the computer and the microcontroller are usually encrypted.

The automatic dispensers may be subject to various types of attacks by criminals.

Particularly, a thief might physically access the cable that connects the computer to the microcontroller of the banknote dispenser (in a relatively simple way in its portion arranged outside the safe). The thief might then connect to the microcontroller (for example, via a computer thereof) to try to force the microcontroller to execute banknote dispensing commands in a fraudulent manner.

In addition, it is habit of the manufacturers to leave one or more ports of the computer free to allow connecting a maintenance device (for example, a USB key) provided to staff assigned to the maintenance of the automatic dispenser.

A thief, once accessed the computer physically, might then connect a device thereof to these (free) ports of the computer to try to force it in this case as well to command the microcontroller of the banknote dispenser to execute banknote dispensing commands in a fraudulent manner.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of detecting any removal of the connectors from the ports of the computer. Particularly, an aspect provides an automatic dispenser of banknotes. The automatic dispenser comprises a management system (arranged outside a safe) and a control system of a banknote dispenser (arranged inside the safe). The management system is provided with one or more ports for connecting thereto; corresponding connectors are coupled with all the ports in condition of use. A motion sensor is associated with each connector for detecting a movement thereof indicative of a decoupling from the corresponding port. The dispensing of the banknote is inhibited according to the movements so detected.

A further aspect provides a corresponding operation method of the automatic dispenser.

A further aspect provides a computer program (software) for implementing a control method of the automatic dispenser.

A further aspect provides a corresponding program product.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). In this respect, it is expressly intended that the drawings are not necessary drawn to scale (with some details that may be exaggerated and/or simplified) and that, unless otherwise indicated, they are merely used to illustrate the structures and procedures described herein conceptually. Particularly.

DETAILED DESCRIPTION

Figure 1:
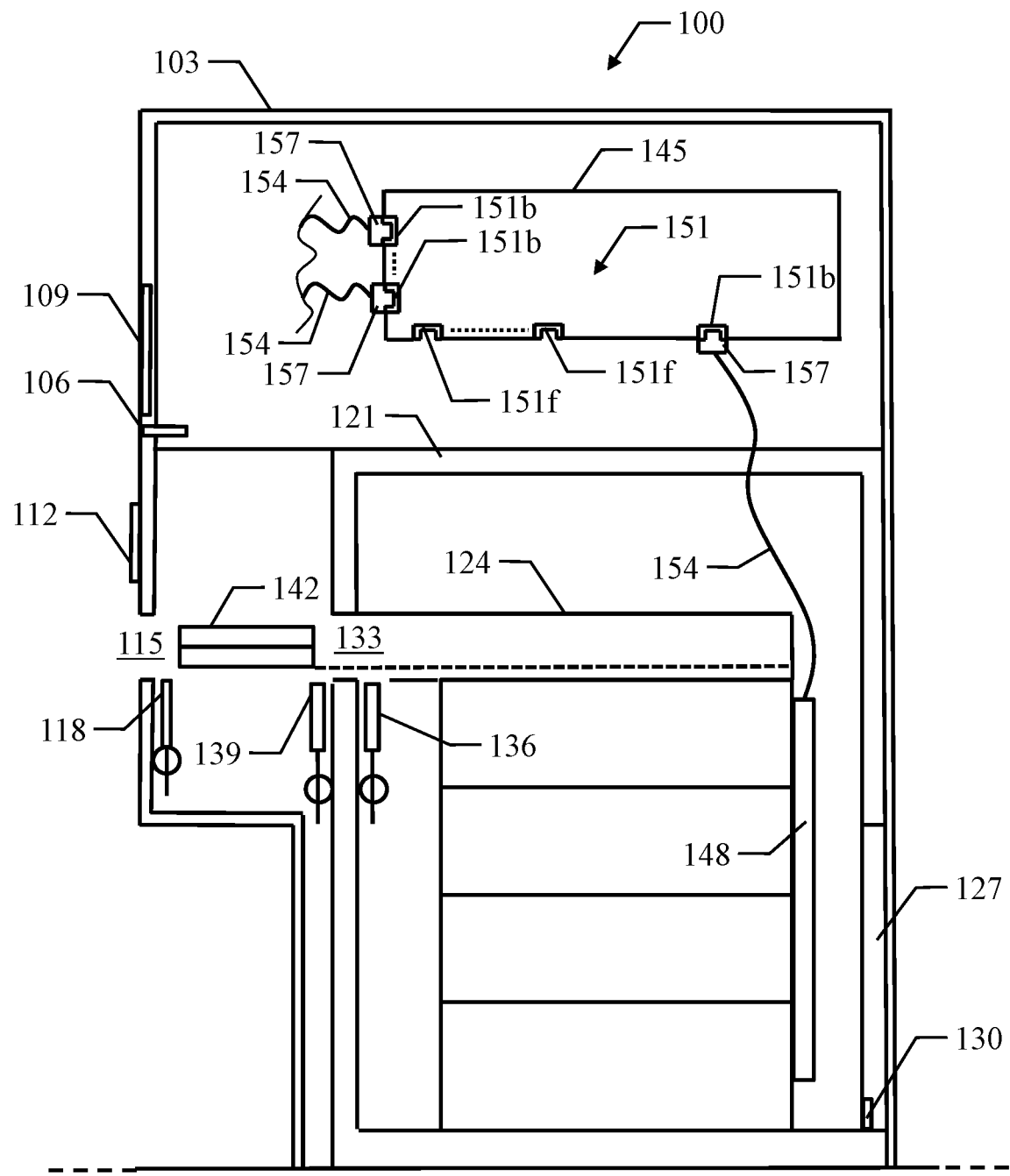
FIG. 1 shows an illustrative representation of an automatic dispenser wherein the solution according to an embodiment of the present disclosure may be applied.

With reference in particular to FIG. 1, an illustrative representation is shown of an automatic dispenser 100 wherein the solution according to an embodiment of the present disclosure may be applied.

The automatic dispenser (of banknote) 100, for example, a Bancomat, is a particular type of ATM that may be used by users (for example, holders of bank accounts, holders of bank or credit cards, and so on) to withdraw cash in the form of banknotes (and/or to deposit it). In general, the automatic dispenser 100 is connected to a central processing system, such as a server, of a bank via an interbank telecommunication network, not shown in the figure, for authorizing and recording the withdrawal operations (of cash).

The automatic dispenser 100 is provided with a cabinet 103. A number of peripherals are accessible by the users of the automatic dispenser 100 to allow them to interact with the automatic dispenser 100, and particularly to perform the withdrawal operations; for example, such peripherals comprise a reader 106 of bank cards (not shown in the figure), a monitor 109 and a pin-pad 112. A presentation opening 115 is provided to dispense one or more banknotes (not shown in the figure) corresponding to the amount of each withdrawal operation, which presentation opening 115 is provided with a barrier structure 118 (for example, a bulkhead). A safe 121 is arranged under the cabinet 103; the safe 121 is an armored structure with a high degree of protection against burglary (normally higher than that of the cabinet 103). The safe 121 is used to secure a banknote dispenser 124 with corresponding drawers for containing the banknotes (not shown in the figure). The safe 121 is provided with a door 127 with one or more deadbolt locks; the door 127 is used to perform replenishing operations of the banknotes into the drawers of the banknote dispenser 124 by dedicated staff. A state detector 130 detects an open or closed state of the door 127. The safe 121 has a passageway opening 133 for letting the banknotes exit from and/or enter into the safe 121; for greater safety, in some cases the passageway opening 133 may be provided with one or more further barrier structures 136 and 139 of armored type. A transport system 142 (for example, a shuttle) collects the banknotes corresponding to each withdrawal operation from inside the safe 121 and conveys them through the passageway opening 133 to outside the presentation opening 115.

A management system, for example, an (industrial) computer 145, arranged outside the safe 121, manages the operation of the whole automatic dispenser 100. Particularly, the computer 145 controls a control system, for example, a microcontroller 148 of the banknote dispenser 124 (arranged inside the safe 121 as well). For this purpose, a number of (physical) connections are provided to allow the computer 145 to interact with the peripherals of the automatic dispenser 100 (reader 106, monitor 109, pin-pad 112 and microcontroller 148). Particularly, the computer 145 is provided with one or more ports 151 for interfacing with it (for example, sockets of USB type). Each of the connections with the computer 145 comprises a transmission line, for example, a cable 154 on which there are transmitted signals being functional to the operation of the automatic dispenser 100 and an electrical power supply (voltage). The cable 154 ends at its extremities with two connectors (two USB connectors in the example at issue). A connector, denoted with the reference 157, is coupled with a correspondent port so occupied, differentiated with the reference 151$b$ (inserted into the corresponding USB socket in the example at issue), while the other connector is likewise coupled with a corresponding port (not shown in the figure) of the corresponding peripheral of the automatic dispenser 100. One or more other ports, differentiated with the reference 151$f$, are instead free (i.e., without any connector inserted therein); for example, these ports 151$f$ are provided for connecting a maintenance device to the computer 145 (not shown in the figure) being provided to staff assigned to the maintenance of the automatic dispenser 100 (for example, for verifying, setting, updating and/or repairing operations of the automatic dispenser 100).

Figure 2:
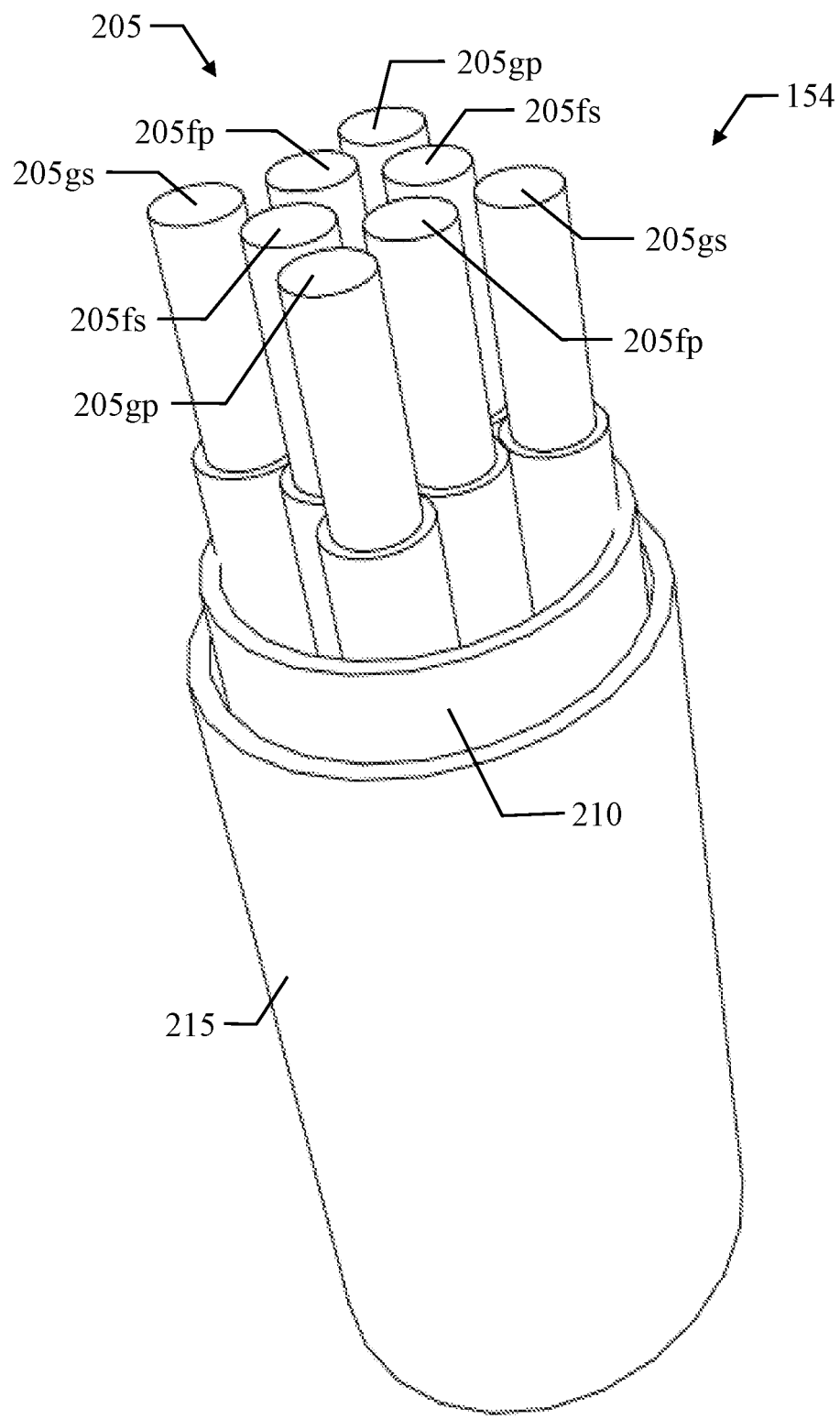
FIG. 2 shows an illustrative representation of a cable of the automatic dispenser according to an embodiment of the present disclosure.

With reference now to FIG. 2, an illustrative representation is shown of a cable 154 of the automatic dispenser according to an embodiment of the present disclosure.

The cable 154 comprises a plurality of conductors 205 (for example, 8 in the specific implementation at issue). Particularly, part of the conductors (signal conductors), differentiated with the references 205$fs$, 250$gs$, are used to transmit signals and part of the conductors (power supply conductors), differentiated with the references 205$fp$, 205$gp$, are used to provide an electrical power supply (voltage) (for example, 4 and 4). Each conductor 205 has a core of electrically conductive material (for example, copper), which is covered with a sheath of electrically insulating material (for example, plastic).

In a specific implementation of the solution according to an embodiment of the present disclosure, the conductors 205 are enclosed in a tamper-proof sheath 210. The sheath 210 protects the conductors 205 mechanically, so as to make it difficult (if not impossible) to cut the cable 154 for accessing the conductors 205 by using simple burglary tools (such as scissors, cutters and the like) in a short time; for example, for this purpose the sheath is made of metal, such as with a stainless-steel mesh having a thickness of 0.1-2.0 mm. The sheath 210 is in turn enclosed in a (further) sheath 215 of electrically insulating material (for example, plastic), which mechanically protects and electrically insulates the sheath 210.

In this way, the cable 154 is self-protected. Therefore, even if a thief manages to access the cable 154 (in its portion outside the safe), the thief may not access its conductors 205 easily (being protected by the metal sheath 210) and thus connect to them in a fraudulent way; this is particularly important in the case of the cable 154 coming from the microcontroller of the banknote dispenser, because it prevents the thief from connecting to the microcontroller to try to force it to execute banknote dispensing commands.

Furthermore, in a specific implementation part of the conductors (functional conductors) 205$fs$, 205$fp$ are functional to the operation of the automatic dispenser and part of the conductors (guard conductors) 205$gs$, 205$gp$ are used to verify an integrity of the cable 154; for example, the functional conductors 250 fs, 205fp comprise two signal conductors 205fs (for exchanging data between the computer and the correspondent peripheral) and two power supply conductors 205fp (for providing the electrical power supply from the computer), and likewise the guard conductors 205gs,205gp comprise two signal conductors 205gs (for receiving data from a corresponding sensor) and two power supply conductors 205gp (for providing the electrical power supply to the sensor). The guard conductors 205gs,205gp implement an anti-tampering function of the cable 154 (for example, allowing detecting interruptions thereof).

As a further improvement, the conductors 205 are visually indistinguishable (for example, all of the same color). In this way, even if a thief managed to force the sheath 210 and access the conductors 205, the thief would not be able to determine the specific function of each conductor 205 to try to force the microcontroller to execute banknote dispensing commands in a fraudulent manner.

This makes it possible to prevent (or at least substantially reduce) corresponding attacks to the automatic dispenser by criminals. Such result is obtained in a simple and inexpensive way; particularly, this may also be applied to already existing automatic dispensers, by simply replacing the (original) cables with the (self-protected) cables of the solution according to an embodiment of the present disclosure.

Figure 3:
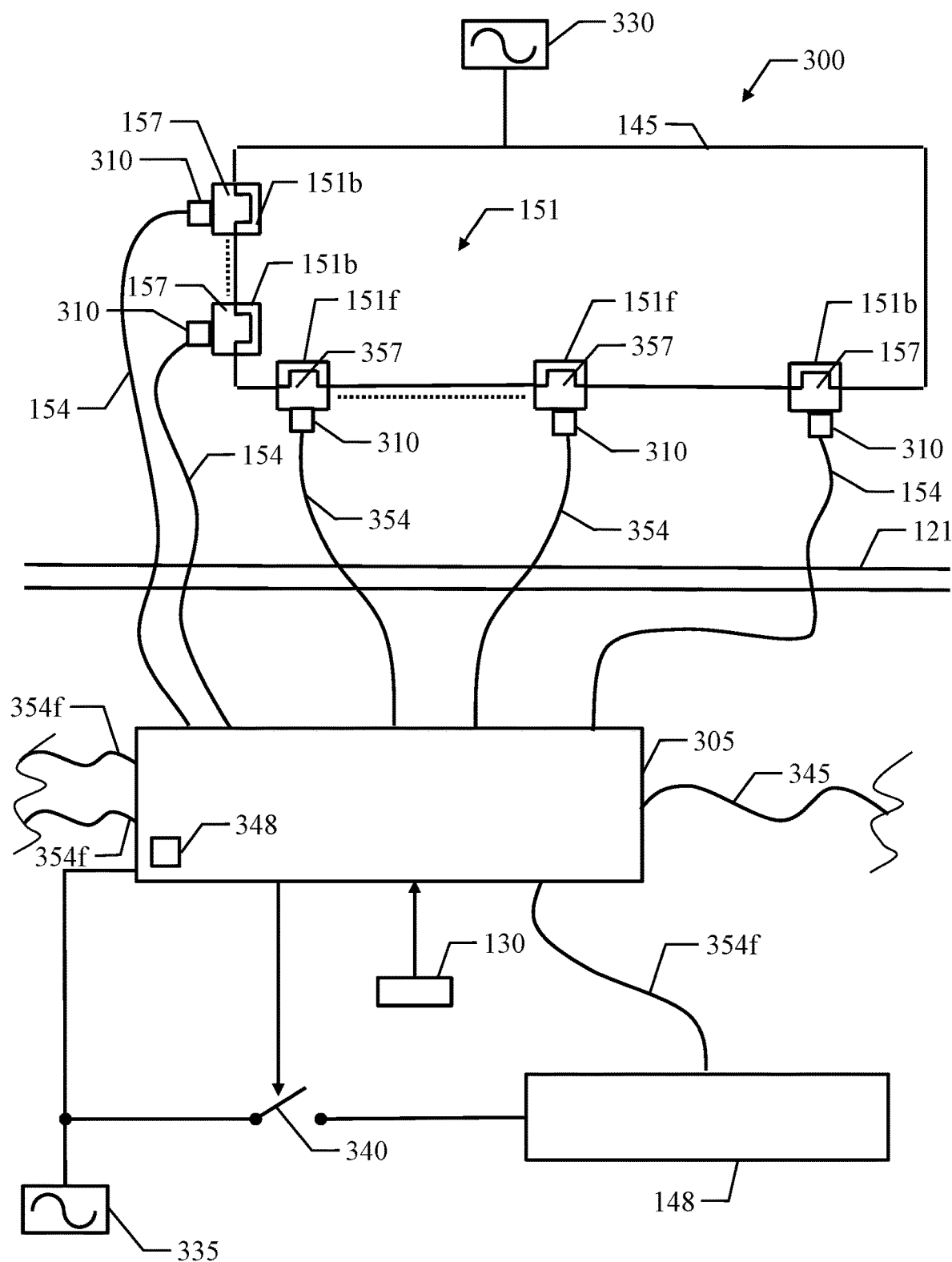
FIG. 3 shows a representation of principle of a detail of an automatic dispenser according to an embodiment of the present disclosure.

With reference now to FIG. 3, a representation of principle is shown of a detail of an automatic dispenser 300 according to an embodiment of the present disclosure.

The automatic dispenser 300 is further provided with a verification system of the connections to the computer 145, for example, an (electronic) control unit 305, which is arranged inside the safe 121. All the ports 151 of the computer 145 (i.e., both the ports 151b and the ports 151f) are occupied. For this purpose, further connections as above are added, each formed by a transmission line, for example, a (self-protected) cable 354 that ends at an extremity with a connector 357 (of USB type in the example at issue) being coupled with a corresponding port 151f All the cables 154,354 extend from the computer 145 (outside the safe 121) to the control unit 305 (inside the safe 121). Further transmission lines, for example, cables 354f, extend from the control unit 305 to the peripherals of the automatic dispenser 300 (of which only the microcontroller 148 being shown in the figure) for forwarding the signals and the electrical power supply functional to their operation (transmitted on the functional conductors of the cables 154). Corresponding verification devices 310 (each comprising a motion sensor, not shown in the figure) are physically associated with the connectors 157,357; the association is such that any (significant) movement of each connector 157,357 is reflected (substantially) in a corresponding movement of the motion sensor of the verification device 310; for example, the verification device 310 is integral with the connector 157, 357, so that each movement of the connector 157,357 involves the same movement of the verification device 310 (and therefore of its movement sensor). The motion sensor of each verification device 310 is capable of detecting its movements, and therefore also those of the corresponding connector 157,357. For example, the motion sensor is an inclinometer, which measures its inclination with respect to the direction of the force of gravity. As a consequence, the movements detected by the motion sensor may be indicative of a removal (at least partial) of the connector 157,357 from its port 151b,151f. The verification device 310 is connected to the guard conductor of the corresponding cable 154,354 for being powered by the control unit 305 and for providing an indication of the movement of its motion sensor to the control unit 305.

The microcontroller 148 and the control unit 305 (inside the safe 121) and the computer 145 (outside the safe 121) receive an electrical power supply, for example, through a mains socket 330 and a mains socket 335, respectively, connected to an electrical grid in condition of use. A power supply switch 340 is arranged inside the safe 121 for interrupting the electrical power supply of the microcontroller 148; the power supply switch 340 is controlled (opened/closed) by the control unit 305. Furthermore, the control unit 305 is coupled with the state detector 130 for receiving a state indication (closed/open) of the door of the safe 121 (not shown in the figure). The control unit 305 is configured for entering an alarm condition according to the indications of the movements being detected by the motion sensors of the verification devices 310 and/or to the electrical power supplies of the cables 154,354; for example, when the safe 121 is closed, as soon as any movement exceeds a threshold value and/or the electrical power supply of a cable 154,354 is missing, the control unit 305 cuts off the electrical power supply to the microcontroller 148 (so as to inhibit the dispensing of the banknotes). A further transmission line, for example, a cable 345 extends from the control unit 305 to an alarm system of the bank (not shown in the figure) for managing the alarm condition. The control unit 305 is further provided with a restore button 348 (or it may receive a remote command from the alarm system) for restoring the operation of the microcontroller 148 (and therefore of the banknote dispenser, not shown in the figure) once the alarm condition has been cleared.

The above-described solution significantly improves the safety of the automatic dispenser. In fact, in this way it is possible to promptly detect any attempt to force the dispensing of the banknotes contained in the safe in a fraudulent manner (for example, if a thief disconnects a connector for connecting it to a computer thereof, a thief disconnects a connector for connecting his/her computer to the corresponding port and/or a thief cuts a cable for connecting it to his/her computer). This makes it possible to prevent (or at least to reduce substantially) corresponding attacks to the automatic dispenser by criminals.

Figure 4:
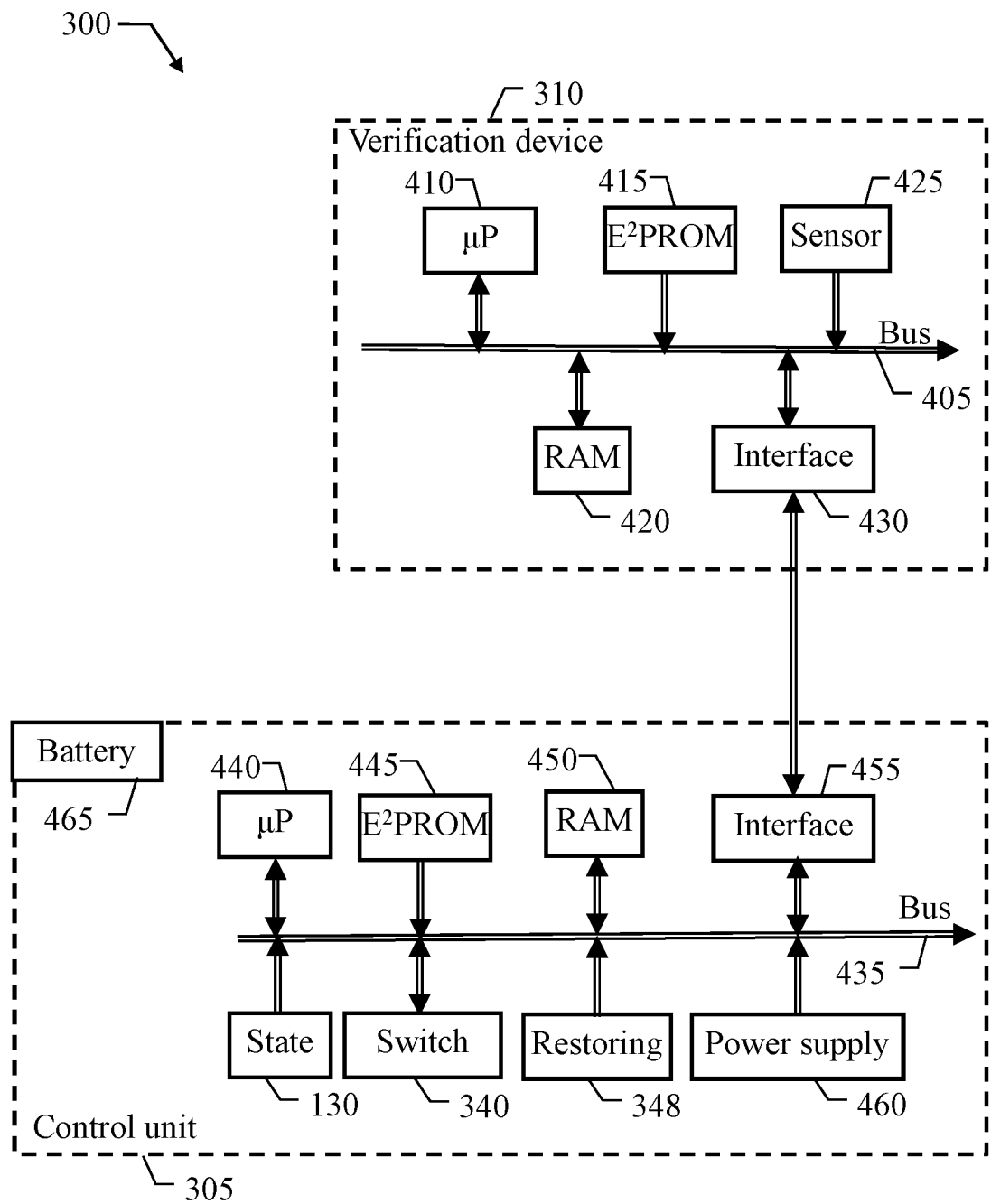
FIG. 4 shows a block diagram of the functional components of the automatic dispenser being relevant to the solution according to an embodiment of the present disclosure.

With reference now to FIG. 4, a block diagram is shown of the functional components of the automatic dispenser 300 being relevant to the solution according to an embodiment of the present disclosure.

Each verification device 310 (only one shown in the figure) comprises several units that are connected among them through a bus structure 405. Particularly, a microprocessor (µP) 410 provides the logic capability of the verification device 310. A non-volatile memory 415 (for example, a flash E²PROM) contains a control program of the microprocessor 410 and a volatile memory (RAM) 420 is used as a working memory by the microprocessor 410. Moreover, the verification device 310 comprises a number of controllers for peripherals, or Input/Output (I/O) units. Particularly, the peripherals comprise the motion sensor, denoted with the reference 425, and a controller 430 for interfacing with the control unit 305.

Likewise, the control unit 305 comprises several units that are connected among them through a bus structure 435. Particularly, a microprocessor (µP) 440 provides the logic capability of the control unit 305. A non-volatile memory 445 (for example, a flash E²PROM) contains a control program of the microprocessor 440 and a volatile memory (RAM) 450 is used as a working memory by the microprocessor 440. Moreover, the control unit 305 comprises a number of controllers for peripherals, or Input/Output (I/O) units; particularly, the peripherals comprise a controller 455 for interfacing with the verification devices 310 (and for supplying them), the state detector 130 (of the door of the safe, not shown in the figure), the power supply switch 340 (for the electrical power supply of the microcontroller, not shown in the figure), the restore button 348 and a power supply detector 460; the power supply detector 460 detects the electrical power supply provided to the control unit 305 by the electrical grid. A battery 465 provides a (back-up) electrical power supply to the control unit 305 in the event of a (temporary) lack of the electrical power supply provided by the electrical grid.

Figure 5:
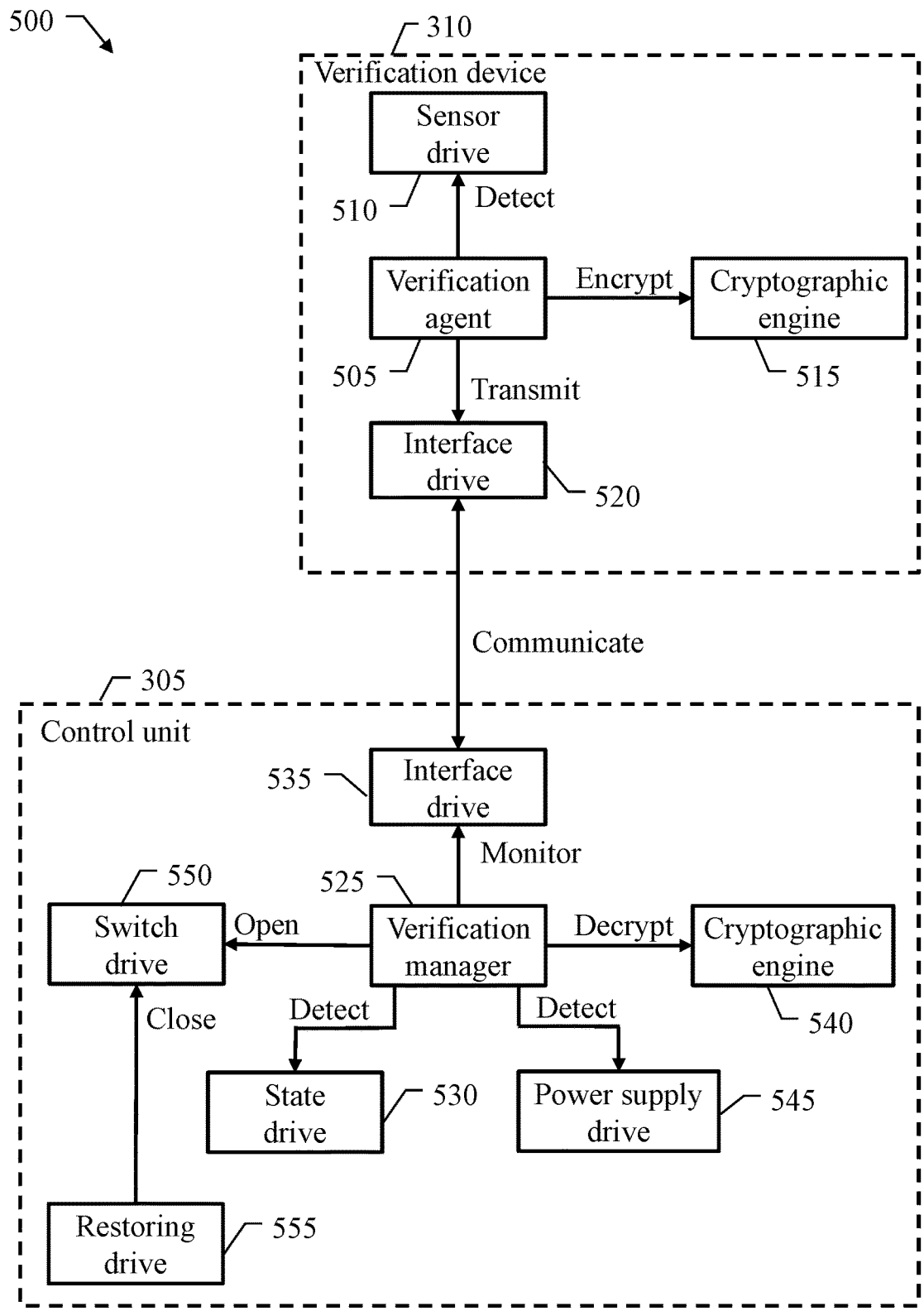
FIG. 5 shows the main software components that may be used to implement the solution according to an embodiment of the present disclosure.

With reference now to FIG. 5, the main software components are shown that may be used to implement the solution according to an embodiment of the present disclosure.

Particularly, all the software components are denoted as a whole with the reference 500. The software components 500 are typically stored in the non-volatile memory of the control unit 305 and of each verification device 310 (only one shown in the figure) and loaded (at least partially) into their working memories when the programs are running. The programs are pre-installed o loaded from removable storage units. In this respect, each program may be a module, segment or portion of code, which comprises one or more executable instructions for implementing the specified logical function.

Starting from each verification device 310, a verification agent 505 performs the verification of the corresponding connector. The verification agent 505 uses a drive of the motion sensor 510 for detecting its movements. The verification agent 505 uses a cryptographic engine 515 for encrypting the indications of such movements. The verification agent 505 uses an interface drive 520 for transmitting the (encrypted) indications of the movements to the control unit 305.

Moving to the control unit 305, a verification manager 525 manages the verification of the ports of the computer. The verification manager 525 uses a drive of the state detector 530 for detecting the state (open/closed) of the door of the safe. The verification manager 525 uses an interface drive 535 for monitoring the verification devices 310 (by communicating with their interface drives 520). The verification manager 525 uses a cryptographic engine 540 for decrypting the indications of the movements received from the verification devices 310. The verification manager 525 uses a drive of the power supply detector 545 for detecting the electrical power supply of the control unit 305. The verification manager 525 commands a drive of the power supply switch 550 for opening it (in the alarm condition). A drive of the restore button 555 commands the same drive of the power supply switch 550 for closing it (for restoring the operation of the banknote dispenser once the alarm condition has been cleared).

Figure 6A:
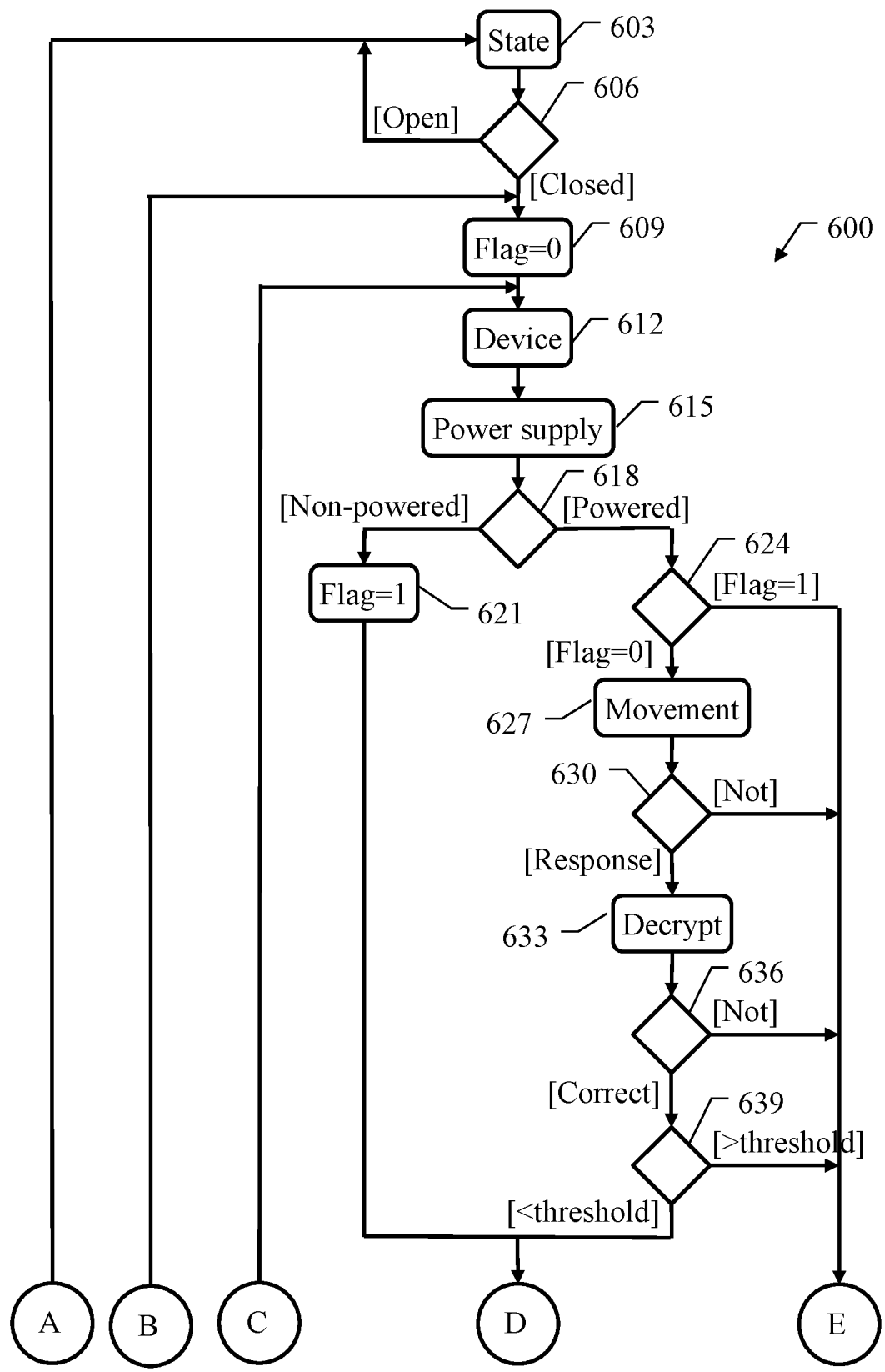
FIG. 6A-FIG. 6B show an activity diagram describing the flow of activities relating to the solution according to an embodiment of the present disclosure.
Figure 6B:
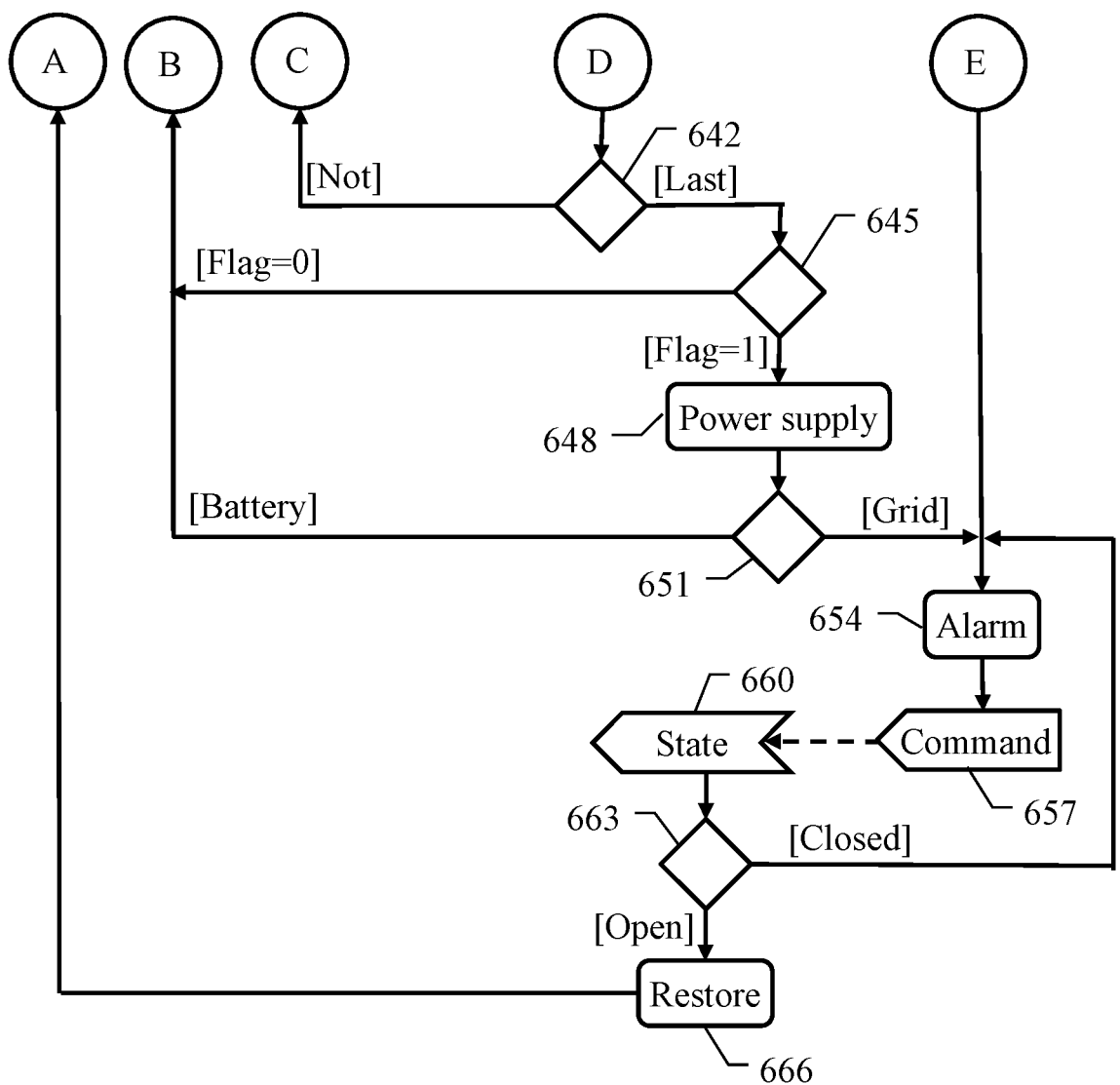

With reference now to FIG. 6A-FIG. 6B, an activity diagram is shown describing the flow of activities relating to the solution according to an embodiment of the present disclosure.

Particularly, the diagram represents an exemplary process that may be used to verify the ports of the computer with a method 600. In this respect, each block may correspond to one or more executable instructions for implementing the specified logical function by the control unit.

Once the control unit has been tuned on, the verification manager executes a verification loop continuously. For this purpose, the verification manager at block 603 detects the state of the door of the safe (via the corresponding drive). The flow of activity branches at block 606 according to this state. If the safe is open, the process returns to the block 603 in an idle loop; this avoids verifying the ports of the computer when the safe is open (in the course of maintenance operations), and then entering the alarm condition when a connector has been removed from one of the (non-used) ports of the computer for connecting a maintenance device by the staff assigned to the maintenance of the automatic dispenser.

Conversely, if the safe is closed the process exits the idle loop by descending to block 609. In this phase, the verification manager resets, by deasserting it (for example, to the logic value 0), a missing power supply flag of the cables. The verification manager at block 612 takes into account one of the verification devices (starting from a first one in any arbitrary order). The verification manager at block 615 determines if the cable of the corresponding connector is powered by the computer (via the interface drive). The flow of activities branches at block 618 according to an outcome of this operation. Particularly, if the cable is not powered the block 621 is executed, whereas if the cable is powered the blocks 624-639 are executed; in any case, the method then passes to block 642.

Considering the block 621 (cable being not powered), the verification manager sets, by asserting it (for example, to the logical value 1), the missing power supply flag (to signify that at least one of the cables is not powered). The method then descend to the block 642.

Considering instead the block 624 (cable being powered), the verification manager examines the missing power supply flag. If the missing power supply flag is deasserted (meaning that no cables, among the ones being verified up to now, is not powered), the verification manager at block 627 submits a request of detection of the movement of its motion sensor to the verification device (via the interface drive). The verification manager at block 630 waits for a response from the verification device. Meanwhile, not shown in the figure, the verification agent of the verification device receives the request via the interface drive, and passes it to the drive of the motion sensor; once it has received the indication of its movement, the verification agent adds it to a corresponding response, encrypts it (via the cryptographic engine) and returns this encrypted response to the control unit (via the interface drive). As soon as the response is received by the verification device (via the interface drive), the verification manager at block 633 extracts the (encrypted) indication of movement and submits it to the cryptographic engine for decrypting it. The flow of activities branches at block 636 according to an outcome of this operation. If what has been obtained has a correct (default) format, this means that it is actually the (genuine) indication of movement being encrypted by the verification device. In this case, the verification manager at block 639 compares the indication of movement with a threshold value (for example, 2-5° as defined in a configuration parameter). If the indication of movement is (possibly strictly) lower than the threshold value, this means that the corresponding connector has not been decoupled (removed) from the port of the computer; in this case, the process descends to block 642.

Considering now block 642, the verification manager determines whether a last verification device has been taken into account. If not, the flow of activities returns to the block 612 for repeating the same operations on a next verification device. Conversely, once all the verification devices have been taken into account, the method descends to block 645.

At this point, the verification manager again examines the missing power supply flag. If the missing power supply flag is deasserted (to signify that all the cables are powered), the method returns to the block 609 for performing a new verification cycle. Conversely, if the missing power supply flag is asserted this means that all the cables are not powered; in this case, the verification manager at block 648 verifies the electrical power supply of the control unit (via the drive of the power supply detector). The flow branches at block 651 according to an outcome of this verification. If the electrical power supply of the control unit is missing (so that the control unit is at the moment powered by the battery), this means that the missing powering of the cables is due to the missing electrical power supply of the control unit; in this case as well, the method returns to the block 609 for performing a new verification loop.

Returning to the block 624, if the missing power supply flag is asserted, this means that while the cable currently under verification is powered one or more of the other cables (already verified) are not powered; this situation may be indicative of a removal of the connectors of the non-powered cables from the corresponding ports of the computer or of a tampering (or malfunctioning) thereof. As a consequence, the verification manager at block 654 enters an alarm condition. Likewise, if at the block 630 the verification manager does not receive any response from the verification device within a maximum time from the submission of the corresponding request (for example, 0.1-1.0 s), this may mean that the verification device and/or the corresponding cable has been tampered (or it is malfunctioning); in this case as well, the method descends to the block 654 (wherein the verification manager enters the alarm condition). Likewise, if at the block 636 the verification manager determines that the movement indication does not have the correct format, this may mean that it is not genuine and therefore not provided by the verification device; in this case as well, the method descends to the block 654 (wherein the verification manager enters the alarm condition). Likewise, if at the block 639 the verification manager determines that the movement indication is (possibly strictly) higher than the threshold value, this may mean that the corresponding connector has been decoupled (removed) from the port of the computer, at least in part; in this case as well, the method descends to the block 654 (wherein the verification manager enters the alarm condition). Likewise, if at the block 651 the verification manager determines that the electrical power supply of the control unit is present, this may mean that the missing power supply of the cables is due to a (substantially simultaneous) removal of all their connectors from the corresponding ports of the computer, or to their tampering (or malfunctioning); in this case as well, the method descends to the block 654 (wherein the verification manager enters the alarm condition).

With reference now to the block 654, in the alarm condition the verification manager opens the power supply switch (via the corresponding drive). As a consequence, the microcontroller turns off thereby inhibiting the dispensing of the banknotes; this implementation is particularly safe, since it prevents any fraudulent control of the microcontroller from outside the safe. In addition, the verification manager may also bring the automatic dispenser to a safety configuration (with all the barrier structures being closed); in addition or in alternative, the verification manager sends a corresponding signaling to the alarm system (for alerting staff assigned to the tele-surveillance and/or the police). In any case, the verification manager at block 657 enters a waiting condition. Subsequently, once the alarm condition has been cleared, the dedicated staff may open the safe and press the restore button (so as to cause the corresponding drive to send a restore command to the verification manager). In response thereto, to be safe the verification manager at block 660 verifies the state of the door of the safe again (via the drive of the state detector). Continuing to block 663, if the door of the safe is closed, the process returns to the block 654 (remaining in the alarm condition, with the possible sending of a further signaling). Conversely, if the door of the safe is open, the verification manager at block 666 restores the normal operation of the automatic dispenser; for this purpose, the verification manager closes the power supply switch (via the corresponding drive) so as to turn on the microcontroller again and, if necessary, it opens one of the barrier structures of the safe. This adds further safety, since it prevents the control unit from being fraudulently controlled from outside the safe to restore the microcontroller. The method then returns to the block 603 for repeating the same operations of above continuously.

Modifications

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides an automatic dispenser of banknotes. However, the automatic dispenser may be of any type (for example, wall-mounted, kiosk-like, installed at any place such as outside/inside a bank, in a shopping center, in a train station, in an airport, with or without the possibility of performing additional functions such as depositing money, making payments, and so on).

In an embodiment, the automatic dispenser comprises a safe for containing the banknotes to be dispensed. However, the safe may be of any type (for example, with none, one or two barrier structures of its passageway opening, and so on) for containing any type of banknotes (for example, in local currency and/or in one or more foreign currencies, and so on).

In an embodiment, the automatic dispenser comprises a banknote dispenser arranged inside the safe for dispensing the banknotes. However, the banknote dispenser may be of any type (for example, with or without drawers for the banknotes, with a recovery drawer for the banknotes being not withdrawn, and so on).

In an embodiment, the automatic dispenser comprises a management system arranged outside the safe for managing the automatic dispenser. However, the management system may be of any type (for example, an industrial computer, a PC and so on) for managing the automatic dispenser in any way (for example, over a network, locally, and so on).

In an embodiment, the automatic dispenser comprises a control system arranged inside the safe for controlling the banknote dispenser under the control of the management system. However, the control system may be of any type (for example, a microcontroller, an electronic control unit, a PLC, an FPGA, and so on).

In an embodiment, the management system has a plurality of ports for connecting thereto. However, the ports may be in any number and of any type (for example, USB, Thunderbolt, serial, parallel, any combination thereof, and so on).

In an embodiment, in condition of use a part of the ports are used to connect the control system to the management system. However, the control system may be connected to the management system via any number of ports.

In an embodiment, the automatic dispenser comprises a plurality of corresponding connectors being coupled with all the ports in condition of use. However, the connectors may be of any type or model, consistent with that of the corresponding ports (for example, male connector for female port, vice-versa, and so on).

In an embodiment, the automatic dispenser comprises a plurality of corresponding motion sensors associated with the connectors for detecting corresponding movements of the motion sensors indicative of corresponding decoupling at least partial of the connectors from the corresponding ports. However, the motion sensors may be of any type (for example, inclinometers, accelerometers, optical reflection sensors, magnetic sensors, electromechanical sensors and so on) for detecting any quantity indicative of their movements (for example, inclination, acceleration, speed, displacement and so on); moreover, the motion sensors may be associated to the connectors in any way (for example, fixed to the connectors, to the corresponding transmission lines, included in corresponding verification devices or stand-alone, and so on).

In an embodiment, the automatic dispenser comprises a verification system arranged inside the safe. However, the verification system may be of any type (for example, an electronic control unit, a microcontroller, a PLC, an FPGA, stand-alone or even integrated in the control system, and so on).

In an embodiment, the automatic dispenser comprises a transmission system extending from the motion sensors to the verification system. However, the transmission system may be implemented in any way (for example, by the transmission lines, stand-alone and so on); particularly, it is possible to add corresponding further transmission lines (either the same or different with respect to the transmission lines), which extend from the motion sensors to the verification system (directly or through a concentrator).

In an embodiment, the transmission system is for transmitting corresponding indications of the movements being detected by the motion sensors to the verification system. However, the movement indications may be transmitted in any way (for example, encrypted, unencrypted and so on).

In an embodiment, the verification system is configured to enter an alarm condition (wherein it inhibits the dispensing of the banknotes) according to the indications of the movements. However, the dispensing of the banknotes may be inhibited in any way (for example, by interrupting the power supply of the control system and/or of the banknote dispenser, by sending a corresponding command to the control system and so on). Moreover, the alarm condition may be of any type (for example, with or without further actions, such as the closure of all the barrier structures, the sending of a signaling, the actuation of an acoustic alarm, the actuation of a staining device of the banknote, any combination thereof and so on). Furthermore, the alarm condition may be reached in any way according to the indications of the movements (for example, as soon as a movement exceeds any threshold value, when this occurs for two or more consecutive verifications and so on).

Further embodiments provide additional advantageous features, which may however be omitted at all in a basic implementation.

Particularly, in an embodiment the automatic dispenser comprises one or more peripherals arranged outside the safe. However, the peripherals may be in any number and of any type (for example, partial, different and/or additional ones with respect to those mentioned above).

In an embodiment, in condition of use one or more of the ports are used for connecting the management system to the peripherals. However, the ports being occupied for this purpose may be in any number (down to none).

In an embodiment, in condition of use one or more of the ports are not used for interfacing with the management system. However, the unused ports may be in any number and they would have been left free for any purpose (for example, for maintenance devices, new devices, simply because available in the management system and so on); moreover, the corresponding connectors may end transmission lines connected to the verification system with the functional conductors being unused (which transmission lines either implement the transmission system or not), or they may also be completely devoid of the transmission lines (being only connected to the transmission system).

In an embodiment, the ports are adapted to providing corresponding electrical power supplies. However, the electrical power supplies of the ports may be of any type (for example, voltage and/or current of any value, either the same or different among the ports) and they may be provided by any number of the ports (all, in part or none).

In an embodiment, the automatic dispenser comprises a corresponding plurality of transmission lines ending with the connectors that extend from the verification system. However, the transmission lines may be of any type (for example, cables, tapes, optical fibers, based on serial/parallel communication, implementing any standard/proprietary communication protocol, using signals being either unencrypted or encrypted via any asymmetric/symmetric encryption system, and so on).

In an embodiment, each of the transmission lines comprises a plurality of conductors. However, the conductors may be in any number and of any type (for example, signal, power supply, control and the like conductors, functional, guard conductors, either the same or different from each other, and so on).

In an embodiment, the conductors of each transmission line are enclosed in a tamper-proof sheath. However, this result may be obtained in any way (for example, with a sheath of any material, such as metal, polyester and the like, having any structure and so on). In any case, the feature of the tamper-proof sheaths may be used even without the feature of the movement sensors.

In an embodiment, one or more of the conductors are adapted to transmitting the electrical power supply provided by the corresponding port. However, the power supply conductors may be in any number and adapted to transmitting electrical power supplies of any type (for example, voltages and/or currents of any value, either the same or different among the various transmission lines, and so on).

In an embodiment, the verification system comprises a power supply detector for detecting the electrical power supply of the transmission lines. However, the power supply detector may be of any type (for example, for detecting voltages, currents and so on).

In an embodiment, the verification system is configured to enter the alarm condition according to an indication of the electrical power supply of the transmission lines being detected by the power supply detector. However, the alarm condition may be reached in any way according to the indications of the electrical power supplies (for example, when the transmission lines are in part not powered and in part powered, when all the transmission lines are not powered in the presence of the electrical power supply of the verification system, when one or more transmission lines are not powered independently of the electrical power supply of the verification system, and so on).

In an embodiment, the conductors are visually indistinguishable. However, this result may be in any way (for example, with conductors of the same color, thickness and so on). In any case, the feature of the indistinguishable conductors may be used even without the feature of the motion sensors or the feature of the tamper-proof sheaths.

In an embodiment, the verification system is configured to enter the alarm condition in response to the indication of presence of the electrical power supply of one or more of the transmission lines and to the indication of absence of the electrical power supply of other one or more of the transmission lines. However, the alarm condition may be reached in any way according to this criterion (for example, as soon as a discordant situation is detected, when this occurs for two or more consecutive verifications, and so on).

In an embodiment, the automatic dispenser comprises a battery arranged inside the safe for supplying the verification system in absence of an electrical power supply thereof. However, the battery may be of any type (for example, with any capacity, either rechargeable or not, and so on).

In an embodiment, the verification system comprises a further power supply detector for detecting the electrical power supply of the verification system. However, the electrical power supply of the verification system may be detected in any way (for example, by detecting the alternating power supply provided by the electrical grid, the direct power supply generated by a corresponding AC/DC converter, and so on).

In an embodiment, the verification system is configured to enter the alarm condition in response to an indication of absence of the electrical power supply of at least one of the transmission lines and an indication of presence of the electrical power supply of the verification system being detected by the further power supply detector. However, the alarm condition may be entered in any way according to this criterion (for example, by verifying the electrical power supply of the verification system if all the ports are not powered or whenever a port is not powered, as soon as a discordant situation is detected, when this occurs for two or more consecutive verifications, and so on).

In an embodiment, the transmission system comprises one or more of the conductors of the corresponding transmission line for transmitting the corresponding indications of the movements from each of the motion sensors to the verification system. However, any number of conductors may be used for this purpose.

In an embodiment, one or more of the conductors of each of the transmission lines are for powering the corresponding motion sensor by the verification system. However, each motion sensor may be powered in any way (for example, through any number of conductors of the corresponding transmission line by the verification system, in an autonomous manner and so on).

In an embodiment, the automatic dispenser comprises a state detector of the safe. However, the state detector may be of any type (for example, magnetic, optical, electromechanical, their combination and so on).

In an embodiment, the verification system is configured to condition said entering the alarm condition to an indication of a closed condition of the safe being detected by the state detector. However, the possibility is not excluded of avoiding this verification (for example, when the verification system may be disabled by accessing it with the safe being open, and so on).

In an embodiment, the verification system comprises a restore command arranged inside the safe for restoring an operation of the banknote dispenser from the alarm condition. However, the restore command may be of any type (for example, a button, a lever and the like, integrated in the verification system or connected thereto, and so on); in addition or in alternative, the banknote dispenser may be restored in another way (for example, through a remote connection, such as via a mobile telephone network, router or the like, with or without verification of the open condition of the safe, and so on).

In an embodiment, the verification system is configured to condition said restoring the operation of the banknote dispenser to an indication of open condition of the safe being detected by the state detector. However, the possibility is not excluded of avoiding this verification (for example, when the operation of the banknote dispenser may be restored remotely, and so on).

In an embodiment, the automatic dispenser comprises a power supply switch for interrupting an electrical power supply of the control system and/or of the banknote dispenser in the alarm condition. However, the power supply switch may be of any type (for example, an electronic, electro-mechanical switch, and so on).

Generally, similar considerations apply if the automatic dispenser has a different structure or comprises equivalent components (for example, of different materials) or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

An embodiment provides an operation method of the automatic dispenser of above. In an embodiment, the method comprises coupling the corresponding connectors with all the ports. In an embodiment, the method comprises detecting the corresponding movements by the motion sensors. In an embodiment, the method comprises transmitting the corresponding indications of the movements from the motion sensors to the verification system. In an embodiment, the method comprises bringing the verification system into the alarm condition according to the indications of the movements.

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program configured for causing the verification system of the automatic dispenser of above to perform a control method of the automatic dispenser when the computer program is executed on the verification system. An embodiment provides a computer program product comprising a computer readable storage medium embodying this computer program. In an embodiment, the control method comprises receiving the corresponding indications of the movements detected by the motion sensors. In an embodiment, the control method comprises bringing the verification system into the alarm condition according to the indications of the movements.

However, the computer program may be implemented as a stand-alone module, as a plug-in for a pre-existing software program (for example, an agent of the control system), or even directly in the latter. In any case, similar considerations apply if the program is structured in a different way, or if additional modules or functions are provided. The program may take any form suitable to be used by any control system (see below), thereby configuring the control system to perform the desired operations; particularly, the program may be in the form of external or resident software, firmware, or microcode (either in object code or in source code, for example, to be compiled or interpreted). Moreover, it is possible to provide the program on any computer readable storage medium; the storage medium is any tangible medium (different from transitory signals per se) that may retain and store instructions for use by the control system. The program may be downloaded to the control system from the storage medium or via a network (for example, the Internet, a wide area network and/or a local area network comprising transmission cables, optical fibers, wireless connections, network devices); one or more network adapters receive the program from the network and forward it for storage into one or more storage devices. In any case, the solution according to an embodiment of the present disclosure lends itself to be implemented even with a hardware structure (for example, by electronic circuits integrated on one or more chips of semiconductor material), or with a combination of software and hardware suitably programmed or otherwise configured.

The invention claimed is:

1. An automatic dispenser of banknotes, the automatic dispenser comprising a safe for containing the banknotes to be dispensed, a banknote dispenser arranged inside the safe for dispensing the banknotes, a management system arranged outside the safe for managing the automatic dispenser, a control system arranged inside the safe for controlling the banknote dispenser under control of the management system, the management system having a plurality of ports for connecting thereto and being adapted to provide corresponding electrical power supplies, in condition of use a part of the ports being used to connect the control system to the management system, a plurality of corresponding transmission lines extending from the verification system ending with corresponding connectors being coupled with all the ports in condition of use, a plurality of corresponding motion sensors associated with the connectors for detecting corresponding movements of the motion sensors indicative of corresponding at least partial decoupling of the connectors from the corresponding ports, a verification system arranged inside the safe comprising a power supply detector for detecting the electrical power supplies of the transmission lines being provided by the corresponding ports and a transmission system extending from the motion sensors to the verification system for transmitting corresponding indications of the movements being detected by the motion sensors to the verification system, the verification system being configured to enter an alarm condition in which the verification system inhibits the dispensing of the banknotes according to the indications of the movements and to an indication of the electrical power supplies of the transmission lines being detected by the power supply detector, the alarm condition being entered in response to the indication of presence of the electrical power supply of one or more of the transmission lines and to the indication of absence of the electrical power supply of another one or more of the transmission lines.

2. The automatic dispenser according to claim 1, wherein the automatic dispenser comprises one or more peripherals arranged outside the safe, in condition of use one or more of the ports being used for connecting the management system to the peripherals.

3. The automatic dispenser according to claim 1, wherein in condition of use one or more of the ports are not used for interfacing with the management system.

4. The automatic dispenser according to claim 1, wherein each of the transmission lines comprises a plurality of conductors, one or more of the conductors being adapted to transmitting the electrical power supply provided by the corresponding port.

5. The automatic dispenser according to claim 4, wherein the conductors of each of the transmission lines are visually indistinguishable.

6. The automatic dispenser according to claim 4, further comprising a battery arranged inside the safe for supplying the verification system in absence of an electrical power supply thereof, the verification system comprising a power supply detector for detecting the electrical power supply of the verification system and being configured to enter the alarm condition in response to the indication of absence of the electrical power supply of at least one of the transmission lines and an indication of presence of the electrical power supply of the verification system being detected by the power supply detector.

7. The automatic dispenser according to claim 4, wherein the transmission system comprises one or more of the conductors of the corresponding transmission line for transmitting the corresponding indications of the movements from each of the motion sensors to the verification system.

8. The automatic dispenser according to claim 4, wherein one or more of the conductors of each of the transmission lines are for powering the corresponding motion sensor by the verification system.

9. The automatic dispenser according to claim 1, further comprising a state detector of the safe, the verification system being configured to condition said entering the alarm condition to an indication of a closed condition of the safe being detected by the state detector.

10. The automatic dispenser according to claim 1, further comprising a restore command arranged inside the safe for restoring an operation of the banknote dispenser from the alarm condition.

11. The automatic dispenser according to claim 10, further comprising a state detector of the safe, wherein the verification system is configured to condition said restoring the operation of the banknote dispenser to an indication of open condition of the safe being detected by the state detector.

12. The automatic dispenser according to claim 1, further comprising a power supply switch for interrupting an electrical power supply of the control system and/or of the banknote dispenser in the alarm condition.

13. A method for operating an automatic dispenser of banknotes, the method comprising:
coupling corresponding connectors ending corresponding transmission lines extending from a verification system, arranged inside a safe for containing the banknotes to be dispensed, with all ports for connecting thereto of a management system arranged outside the safe for managing the automatic dispenser, the ports being adapted to providing corresponding electrical power supplies and a part of the ports being used to connect a control system arranged inside the safe for controlling a banknote dispenser, arranged inside the safe for dispensing the banknotes, under the control of the management system,
detecting corresponding movements indicative of corresponding at least partial decoupling of the connectors from the corresponding ports by a plurality of corresponding motion sensors associated with the connectors,
transmitting the corresponding indications of the movements from the motion sensors to the verification system,
detecting the electrical power supplies of the transmission lines being provided by the corresponding ports by a power supply detector comprised in the verification system, and
bringing the verification system into the alarm condition according to the indications of the movements and to the indication of the electrical power supplies of the transmission lines being detected by the power supply detector, the alarm condition being entered in response to the indication of presence of the electrical power supply of one or more of the transmission lines and to the indication of absence of the electrical power supply of another one or more of the transmission lines.

14. A non-transitory computer-readable medium storing instructions that, when executed, cause a verification system of an automatic dispenser of banknotes to indications of detected by sensors, to receive corresponding indications of electrical power supplies of transmission lines detected by a power supply detector, and to the verification system to the alarm condition according to the indications of the movements and to the indications of the electrical power supplies of the transmission lines, the alarm condition being entered in response to an indication of a presence of the electrical power supply of one or more of the transmission lines and to an indication of absence of the electrical power supply of another one or more of the transmission lines.

15. The automatic dispenser according to claim 4, wherein the conductors of each of the transmission lines are enclosed in a tamper-resistant sheath.

* * * * *